US012563030B2

(12) United States Patent
Perlman et al.

(10) Patent No.: US 12,563,030 B2
(45) Date of Patent: Feb. 24, 2026

(54) PER-SERVER CUSTOMIZED ACCESS CREDENTIALS

(71) Applicant: Dell Products L.P., Round Rock, TX (US)

(72) Inventors: Radia J. Perlman, Redmond, WA (US); Charles Kaufman, Redmond, WA (US)

(73) Assignee: Dell Products L.P., Round Rock, TX (US)

( * ) Notice: Subject to any disclaimer, the term of this patent is extended or adjusted under 35 U.S.C. 154(b) by 455 days.

(21) Appl. No.: 17/988,863

(22) Filed: Nov. 17, 2022

(65) Prior Publication Data

US 2024/0171567 A1 May 23, 2024

(51) Int. Cl.
H04L 9/40 (2022.01)

(52) U.S. Cl.
CPC .................................. H04L 63/083 (2013.01)

(58) Field of Classification Search
CPC ...................................................... H04L 63/083
See application file for complete search history.

(56) References Cited

U.S. PATENT DOCUMENTS

| | | |
|---|---|---|
| 5,491,752 A | 2/1996 | Kaufman et al. |
| 5,805,803 A | 9/1998 | Birrell et al. |
| 5,892,828 A | 4/1999 | Perlman |
| 8,397,059 B1 * | 3/2013 | Ferguson .............. H04L 9/3271 |
| | | 713/168 |
| 9,659,190 B1 | 5/2017 | Perlman et al. |
| 9,779,269 B1 | 10/2017 | Perlman |
| 9,906,361 B1 | 2/2018 | Perlman et al. |
| 10,284,534 B1 | 5/2019 | Perlman et al. |

(Continued)

FOREIGN PATENT DOCUMENTS

| | | |
|---|---|---|
| GB | 2399435 A | 9/2004 |
| WO | 2001052025 A2 | 7/2001 |

(Continued)

OTHER PUBLICATIONS

Amazon Web Services, "HashiCorp Vault on AWS," https://aws.amazon.com/quickstart/architecture/vault/, Accessed Oct. 24, 2022, 5 pages.

(Continued)

*Primary Examiner* — Shewaye Gelagay
(74) *Attorney, Agent, or Firm* — Ryan, Mason & Lewis, LLP

(57) ABSTRACT

An apparatus comprises at least one processing device that includes a processor coupled to a memory. The processing device is configured to obtain access credentials for accessing a protected resource via a server over a network, to modify at least a portion of the obtained access credentials based at least in part on identifying information of at least (Continued)

one of the protected resource and the server, and to utilize the modified access credentials in place of the obtained access credentials in an authentication protocol carried out with the server. In some embodiments, modifying at least a portion of the obtained access credentials illustratively comprises modifying at least a portion of the obtained access credentials in a manner compliant with one or more credential format rules for the protected resource. The access credentials may comprise at least one of a username and a password.

20 Claims, 7 Drawing Sheets

(56) References Cited

U.S. PATENT DOCUMENTS

| | | | | |
|---|---|---|---|---|
| 10,298,551 | B1 | 5/2019 | Perlman et al. | |
| 10,397,207 | B1 * | 8/2019 | Huynh | H04L 9/0863 |
| 10,819,700 | B1 | 10/2020 | Perlman | |
| 11,019,033 | B1 | 5/2021 | Perlman et al. | |
| 11,042,629 | B2 | 6/2021 | Perlman et al. | |
| 11,128,460 | B2 | 9/2021 | Perlman et al. | |
| 11,374,769 | B2 | 6/2022 | Perlman et al. | |
| 2004/0168083 | A1 * | 8/2004 | Gasparini | H04L 63/168 |
| | | | | 713/176 |
| 2007/0178885 | A1 * | 8/2007 | Lev | H04W 12/06 |
| | | | | 713/168 |
| 2016/0156614 | A1 * | 6/2016 | Jain | H04L 63/083 |
| | | | | 726/6 |

FOREIGN PATENT DOCUMENTS

| | | | | |
|---|---|---|---|---|
| WO | WO-0152025 A2 * | 7/2001 | ........ | H04L 63/0815 |
| WO | 2001052025 A3 | 5/2002 | | |

OTHER PUBLICATIONS

Amazon Web Services, "HashiCorp Vault on the AWS Cloud Quick Start Deployment Guide," https://aws-quickstart.github.io/quickstart-hashicorp-vault/, Sep. 2022, 15 pages.

Hashicorp, "Vault Documentation," https://developer.hashicorp.com/vault/docs, Accessed Oct. 24, 2022, 50 pages.

B. Muthukadan, "Selenium Python—Getting Started," https://selenium-python.readthedocs.io/getting-started.html, Accessed Oct. 27, 2022, 5 pages.

J. Lam "Security Intentions and the Persistence of Passwords," Bitwarden Black and White Paper, May 2022, 11pages.

Bitwarden, "Move Fast and Securely with the Password Manager Trusted by Millions," https://bitwarden.com/, Accessed Oct. 27, 2022, 9 pages.

Lastpass, "Simplify Your Life," https://www.lastpass.com/, Accessed Oct. 27, 2022, 3 pages.

1Password, "The World's Most-loved Password Manager," https://1password.com/, Accessed Oct. 27, 2022, 5 pages.

U.S. Appl. No. 17/976,965 filed in the name of Seth Rothschild et al. on Oct. 31, 2022, and entitled "Authentication Service for Automated Distribution and Revocation of Shared Credentials.".

* cited by examiner

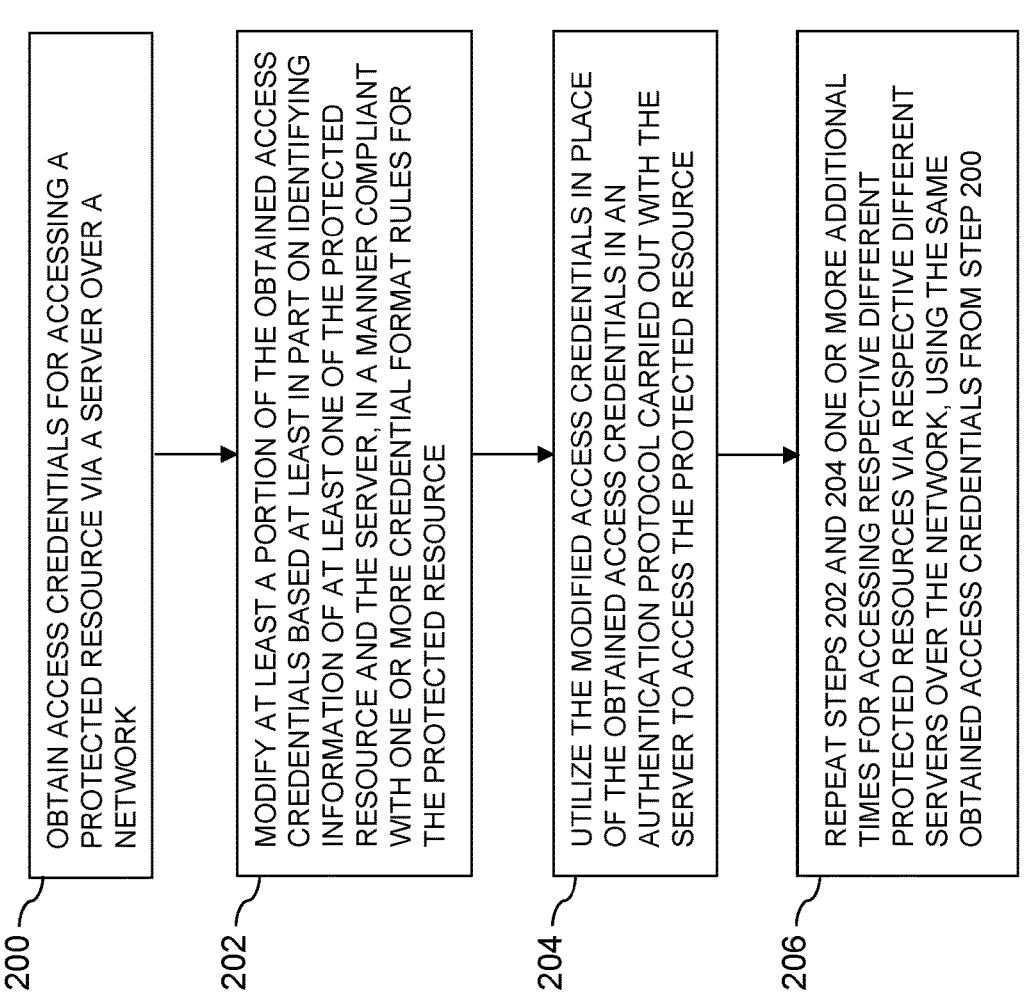

200 — OBTAIN ACCESS CREDENTIALS FOR ACCESSING A PROTECTED RESOURCE VIA A SERVER OVER A NETWORK

202 — MODIFY AT LEAST A PORTION OF THE OBTAINED ACCESS CREDENTIALS BASED AT LEAST IN PART ON IDENTIFYING INFORMATION OF AT LEAST ONE OF THE PROTECTED RESOURCE AND THE SERVER, IN A MANNER COMPLIANT WITH ONE OR MORE CREDENTIAL FORMAT RULES FOR THE PROTECTED RESOURCE

204 — UTILIZE THE MODIFIED ACCESS CREDENTIALS IN PLACE OF THE OBTAINED ACCESS CREDENTIALS IN AN AUTHENTICATION PROTOCOL CARRIED OUT WITH THE SERVER TO ACCESS THE PROTECTED RESOURCE

206 — REPEAT STEPS 202 AND 204 ONE OR MORE ADDITIONAL TIMES FOR ACCESSING RESPECTIVE DIFFERENT PROTECTED RESOURCES VIA RESPECTIVE DIFFERENT SERVERS OVER THE NETWORK, USING THE SAME OBTAINED ACCESS CREDENTIALS FROM STEP 200

APPS

602-L

VM AND/OR
CONTAINER
SET L

604

605

610-2

APPS 602-2

VM AND/OR
CONTAINER
SET 2

610-1

APPS 602-1

VM AND/OR
CONTAINER
SET 1

VIRTUALIZATION INFRASTRUCTURE

PHYSICAL INFRASTRUCTURE

PER-SERVER CUSTOMIZED ACCESS CREDENTIALS

FIELD

The field relates generally to controlling access to information resources, and more particularly to techniques for implementing user authentication in an information processing system.

BACKGROUND

Information processing systems are typically configured to require user authentication before granting a user device access to protected resources available over a network such as the Internet. For example, online user accounts for various websites generally require successful execution of password-based user authentication protocol for a given account before a user is granted access to that account. However, it is not unusual for a given user to utilize the same password for multiple distinct websites, instead of attempting to remember a different password for each separate website. Unfortunately, this practice tends to lead to significant security problems, such as an increased vulnerability to user impersonation and man-in-the-middle (MITM) attacks. A need therefore exists for techniques that can provide enhanced security for a given user that utilizes the same or similar access credentials for multiple distinct websites or other protected resources.

SUMMARY

Illustrative embodiments disclosed herein provide techniques for implementing per-server customized access credentials. For example, one or more such embodiments configure a client device or other type of user device to generate customized access credentials for respective ones of multiple servers from a single common access credential or portion thereof. These embodiments advantageously provide substantially enhanced security, by limiting vulnerability to user impersonation and MITM attacks, and are simple to implement without requiring any modification to the servers or their respective interfaces.

In an illustrative embodiment, an apparatus comprises at least one processing device that includes a processor coupled to a memory, with the at least one processing device being configured to obtain access credentials for accessing a protected resource via a server over a network, to modify at least a portion of the obtained access credentials based at least in part on identifying information of at least one of the protected resource and the server, and to utilize the modified access credentials in place of the obtained access credentials in an authentication protocol carried out with the server.

Modifying at least a portion of the obtained access credentials in one or more embodiments illustratively comprises, for example, modifying at least a portion of the obtained access credentials in a manner compliant with one or more credential format rules for the protected resource.

In some embodiments, the access credentials may comprise, for example, at least one of a username and a password, and the protected resource may comprise, for example, an access-controlled user account of a website hosted at least in part by the server. A wide variety of other types of access credentials and associated protected resources may be utilized in other embodiments.

Additionally or alternatively, the identifying information of at least one of the protected resource and the server comprises at least an identifier of at least one of the protected resource and the server.

In some embodiments, modifying at least a portion of the obtained access credentials based at least in part on identifying information of at least one of the protected resource and the server comprises performing one or more hash operations on at least a portion of the obtained access credentials utilizing the identifying information of at least one of the protected resource and the server.

Additionally or alternatively, utilizing the modified access credentials in place of the obtained access credentials in an authentication protocol carried out with the server in some embodiments illustratively comprises, for example, sending a username of the access credentials in unmodified form to the server with a modified password.

As another example, utilizing the modified access credentials in place of the obtained access credentials in an authentication protocol carried out with the server in some embodiments illustratively comprises sending a username of the access credentials in unmodified form to the server with a result of performing one or more hash operations on (i) a challenge received from the server and (ii) a modified password.

These and other illustrative embodiments include, without limitation, systems, apparatus, methods and computer program products comprising processor-readable storage media.

BRIEF DESCRIPTION OF THE DRAWINGS

FIG. 2 is a flow diagram of a process for implementing per-server customized access credentials in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
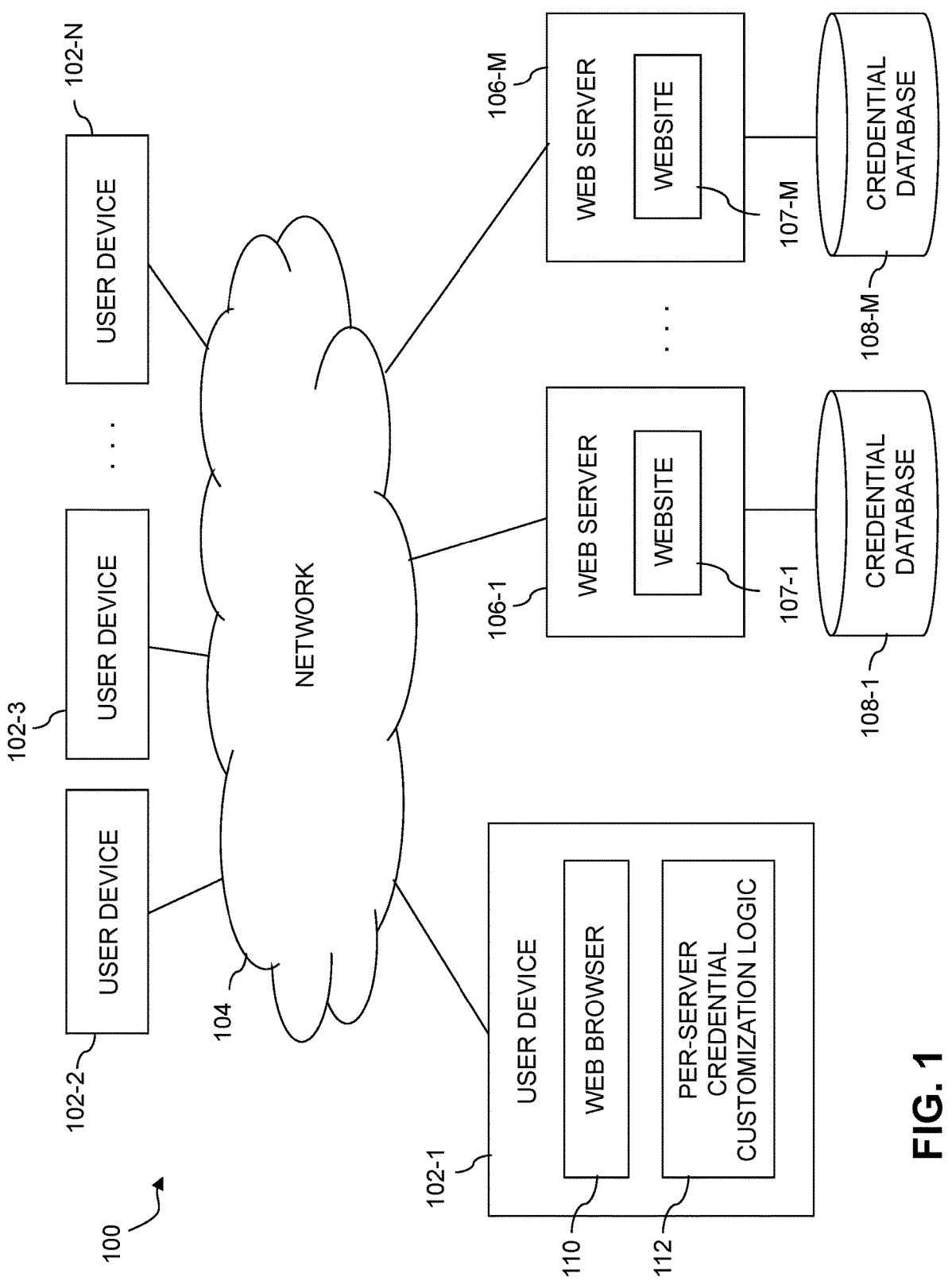
FIG. 1 is a block diagram of an information processing system implementing per-server customized access credentials in an illustrative embodiment.

FIG. 1 shows an information processing system 100 configured in accordance with an illustrative embodiment. The information processing system 100 comprises a plurality of user devices 102-1, 102-2, 102-3, . . . 102-N, collectively referred to herein as user devices 102. The user devices 102 are coupled to a network 104. Also coupled to the network 104 are a plurality of web servers 106-1, . . . 106-M, illustratively implementing respective websites 107-1, . . . 107-M. The web servers 106-1, . . . 106-M are coupled to or otherwise associated with respective credential databases 108-1, . . . 108-M.

The user device 102-1 as illustrated comprises a web browser 110 and per-server credential customization logic 112. Each of one or more of the other user devices 102 can be configured in a similar manner. Although the per-server credential customization logic 112 in the present embodiment is illustratively shown as being implemented entirely within the user device 102-1, other arrangements are possible. For example, in other embodiments, the per-server credential customization logic 112 may be implemented at least in part on a separate processing platform comprising one or more processing devices, each having at least one processor coupled to at least one memory, such as a platform implementing an authentication service that communicates with one or more of the user devices 102 over the network 104.

Accordingly, illustrative embodiments disclosed herein are highly flexible in terms of the particular manner in which the per-server credential customization logic 112 is implemented within the system 100. In addition, the configuration of the web servers 106, websites 107 and credential databases 108 can be varied relative to the example arrangement shown in FIG. 1. For example, multiple websites may be implemented on a single web server, or a single website may be distributed across multiple web servers.

A given one of the user devices 102 may comprise, for example, a mobile telephone, a laptop computer, a tablet computer, a desktop computer or another type of device from which a user authenticates to one or more of the web servers 106 in order to obtain access to secure content of one or more of the websites 107. Such user devices 102 are examples of what are more generally referred to herein as "processing devices." It is also possible that one or more of the user devices 102 may be implemented at least in part using cloud-based virtualization infrastructure such as a virtual machine or container. A given one of the user devices 102 is illustratively equipped with at least one web browser 110, such as a Google Chrome web browser, a Microsoft Edge web browser, a Microsoft Internet Explorer web browser, a Mozilla Firefox browser, or another suitable web browser. Combinations of multiple distinct web browsers may be implemented on the given user device.

The user devices 102 in some embodiments comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. For example, in some embodiments, one or more of the user devices 102 can include Internet of Things (IoT) sensors and other types of IoT processing devices that authenticate to the web servers 106 or other devices using access credentials. The term "user device" as used herein is intended to be broadly construed so as to encompass IoT processing devices as well as other types of devices that are configured to participate in a user authentication protocol using access credentials in order to obtain access to a protected resource.

Although multiple user devices 102 and web servers 106 are shown in the FIG. 1 embodiment, other embodiments can include a single user device and/or a single web server rather than multiple instances of such components. The variables N and M denoting respective numbers of user devices 102 and web servers 106 are therefore considered arbitrary integer values greater than or equal to one.

The network 104 is assumed to comprise a portion of a global computer network such as the Internet, although other types of networks can be part of the information processing system 100, including a wide area network (WAN), a local area network (LAN), a satellite network, a telephone or cable network, a cellular network such as a 4G or 5G network, a wireless network such as a WiFi, WiMAX, Bluetooth or near field communication (NFC) network, or various portions or combinations of these and other types of networks. The information processing system 100 in some embodiments therefore comprises combinations of multiple different types of networks each comprising processing devices configured to communicate using IP or other related communication protocols. Numerous alternative networking arrangements are possible in a given embodiment, as will be appreciated by those skilled in the art.

The credential databases 108 store respective sets of access credentials such as usernames and passwords for their respective web servers 106 and web sites 107 and for user accounts of each of one or more users of the user devices 102. Other types of user account information, such as login cookies, can also be stored for respective ones of a plurality of user accounts. The passwords, usernames, login cookies and other types of user account information may be stored in a given one of the credential databases 108 in encrypted form. Examples of other types of user account information that may be stored in a given one of the credential databases include other characteristics of the user and/or the user devices of that user, as well as other types of information characterizing user behavior. These other types of user account information can further include any type of information that may be applied in a given user authentication protocol implemented within system 100.

The credential databases 108 in the present embodiment are illustratively implemented as part of one or more storage systems coupled to or otherwise associated with one or more processing devices of the respective web servers 106. Such storage systems can comprise any of a variety of different types of storage including by way of example network-attached storage (NAS), storage area networks (SANs), direct-attached storage (DAS) and distributed DAS, as well as combinations of these and other storage types, including but not limited to flash storage, storage arrays, software-defined storage, cloud storage and object-based storage.

Although shown as being arranged externally to the web servers 106 in the illustrative embodiment of FIG. 1, the credential databases 108 in some embodiments can be at least in part internal to their respective corresponding web servers 106. For example, at least portions of the credential databases 108 can be implemented as respective in-memory databases utilizing one or more memories of at least one processing device that implements the respective corresponding web servers 106.

As indicated above, utilizing the same password or other access credentials for multiple distinct websites or other protected resources under conventional practice tends to lead to significant security problems, such as an increased vulnerability to user impersonation and MITM attacks.

Illustrative embodiments disclosed herein provide techniques for implementing per-server customized access credentials. For example, one or more such embodiments configure at least one processing device in a manner that can provide substantially enhanced security for a given user that utilizes the same or similar access credentials for multiple distinct websites or other protected resources.

In some embodiments, this involves, for example, configuring the per-server credential customization logic 112 of user device 102-1 to generate customized access credentials for respective ones of multiple servers from a single common access credential or particular portion thereof. These and other embodiments disclosed herein can advantageously provide substantially enhanced security, by limiting vulnerability to user impersonation and MITM attacks, and are simple to implement without requiring any modification to the web servers 106 or their respective interfaces.

In an illustrative embodiment, user device 102-1 is configured to obtain access credentials for accessing a protected resource via a given one of the web servers 106 over the network 104. For example, the user device 102-1 can obtain the access credentials directly from a corresponding user, or can retrieve them from memory if the access credentials have been previously provided and utilized on the user device 102-1. The user device 102-1 is further configured to modify at least a portion of the obtained access credentials based at least in part on identifying information of at least one of the protected resource and the given server, and to utilize the modified access credentials in place of the obtained access credentials in an authentication protocol carried out with the server.

In some embodiments, modifying at least a portion of the obtained access credentials illustratively comprises modifying at least a portion of the obtained access credentials in a manner compliant with one or more credential format rules for the protected resource. Such modification is illustratively configured to ensure that the resulting modified access credentials are generated in a manner that is compliant with one or more credential format rules for the protected resource. It should be noted in this regard that some protected resources may have very flexible access credential format rules (e.g., a password can be any character string of length from 4 to 64 characters), in which case a general credential format (e.g., any 15-character string selected from upper and lower case characters and digits) would be considered compliant with the flexible credential format rules. In such an arrangement, the user device 102-1 need not be aware of specific per-server formatting constraints, but can instead generate the modified access credentials in accordance with a general credential format that is likely to be acceptable to at least a threshold percentage of typical websites.

Such functionality is illustratively implemented at least in part by per-server credential customization logic 112, through interaction with the user of the user device 102-1 and with the given web server via respective user and web server interfaces. For example, example algorithms or other processes and associated program code for per-server credential customization as disclosed herein are illustratively implemented at least in part by the per-server credential customization logic 112 of the user device 102-1.

The user device 102-1 is an example of what is more generally referred to herein as "at least one processing device." Other arrangements of one or more processing devices can be used to implement the disclosed functionality for per-server customized access credentials as described herein.

The access credentials illustratively comprise, for example, at least one of a username and a password, and the protected resource illustratively comprises an access-controlled user account of a website. A wide variety of other types of access credentials and associated protected resources may be utilized in other embodiments.

For example, in some embodiments, the protected resource can be an entire website, rather than any particular user account on that website. In other words, the website in its entirety may be considered the protected resource in some embodiments.

As another example, the protected resource may comprise an external interface to a protected processing device or set of such processing devices. For example, the techniques disclosed herein can be used to allow the same password to be utilized to access multiple distinct protected processing devices.

In some embodiments, modifying at least a portion of the obtained access credentials based at least in part on identifying information of at least one of the protected resource and the server illustratively comprises hashing a first password of the obtained access credentials with the identifying information to generate a second password different than the first password but compliant with the one or more credential format rules for the protected resource.

Terms such as "hash" and "hashing" as used herein are intended to be broadly construed, and should not be interpreted as being limited to particular algorithms such as a Secure Hashing Algorithm (SHA) and variants thereof such as SHA256, SHA512, etc. Accordingly, any of a wide variety of hashing techniques may be used in illustrative embodiments herein.

The identifying information of at least one of the protected resource and the server can comprise, for example, at least an identifier of at least one of the protected resource and the server. The identifier of the protected resource can comprise, for example, a uniform resource locator (URL) of a corresponding website, a name of the website and/or other information identifying the protected resource, or portions or combinations of such information. The identifier of the server can comprise, again by way of illustrative example only, a name, universal device identifier, network address and/or other information identifying the server, or portions or combinations of such information.

Additionally or alternatively, modifying at least a portion of the obtained access credentials based at least in part on identifying information of at least one of the protected resource and the server in some embodiments comprises performing one or more hash operations on at least a portion of the obtained access credentials utilizing the identifying information of at least one of the protected resource and the server.

For example, modifying at least a portion of the obtained access credentials based at least in part on identifying information of at least one of the protected resource and the server illustratively further comprises converting a result of performing the one or more hash operations into a character string that complies with the one or more credential format rules for the protected resource.

As another example, modifying at least a portion of the obtained access credentials illustratively comprises generating a modified password at least in part by performing the one or more hash operations on a password of the obtained access credentials using the identifying information of at least one of the protected resource and the server.

In some embodiments, utilizing the modified access credentials in place of the obtained access credentials in an authentication protocol carried out with the server illustratively comprises sending a username of the access credentials in unmodified form to the server with a modified password.

As another example, utilizing the modified access credentials in place of the obtained access credentials in an authentication protocol carried out with the server illustratively comprises sending a username of the access credentials in unmodified form to the server with a result of performing one or more hash operations on (i) a challenge received from the server and (ii) a modified password.

In some embodiments, the per-server credential customization logic is configured to allow a user to enter the same password into web browser 110 for several different servers when attempting to access corresponding protected resources, and the per-server credential customization logic 112 automatically translates the password entered by the user into a different password that is customized to a specific server. The per-server credential customization logic 112 uses that different password any time that the user interacts with the corresponding server. For example, the user might choose the username charliekaufman and the password #DEF456! for two websites: abc.com and xyz.com. The per-server credential customization logic 112 in such an embodiment is configured to automatically translate the password into a first variant (e.g., Ab73$cmqb) when the user device 102-1 is accessing the website abc.com and to automatically translate the password into a second variant (e.g., ˆxkA#ake93x) when the user device 102-1 is accessing the website xyz.com.

In some embodiments, when a user is first establishing his or her access credentials to access a protected resource via a given server or later when changing them, the user-entered password may be hashed with the server name, or other identifying information of at least one of the protected resource and the server, to form a modified password, and the modified password is then sent to the server. The sending of the modified password to the server may occur even though the authentication protocol is subsequently going to take place via a challenge/response protocol and the modified password is not going to be sent to the server as part of the carrying out of that challenge/response protocol with the server. Numerous other arrangements involving utilization of modified access credentials in carrying out an authentication protocol with a server are possible using the techniques disclosed herein.

In some embodiments, the user device 102-1 is further configured to obtain at least a portion of the one or more credential format rules for the protected resource from at least one external source. For example, the user device 102-1 may obtain the one or more credential format rules from the server associated with the protected resource. Additionally or alternatively, the user device 102-1 may obtain the one or more credential format rules from a database that stores a plurality of different sets of one or more credential format rules for respective ones of a plurality of protected resources.

It should be noted that the per-server credential customization logic 112 can be adapted in a straightforward manner for use in multi-factor authentication environments, although it is to be appreciated that use of multi-factor authentication is not required in illustrative embodiments disclosed herein.

Additional illustrative embodiments will now be described with reference to a particular user, referred to as Alice. It is assumed that Alice would like to utilize the same password for obtaining access to different protected resources via respective multiple servers, including at least a server X and at least one different server Y. Illustrative embodiments disclosed herein provide significant security enhancements in this context, such as preventing an attacker who has stolen the relevant portions of the credential database at server X from impersonating Alice at the different server Y, even if Alice has chosen the same password for both servers. As another example, such embodiments can also prevent a malicious server X from acting as an active MITM to impersonate Alice to the different server Y when Alice has chosen the same password for both servers. The servers referred to in this portion of the description may be viewed as respective ones of the web servers 106 of system 100.

In some embodiments, the servers utilize various authentication processes to authenticate Alice, illustratively over a transport layer security (TLS) connection or other type of secure connection through the network 104. In the following, the machine or other user device 102-1 that Alice is using to access protected resources over the network 104 is referred to as a "client" and the terminology h(pwd) denotes "hash of pwd" and "pwd" denotes a particular password selected by Alice.

Example authentication processes utilized in system 100 in illustrative embodiments may include one or more of the following different types, although these are only examples, and it is to be appreciated that additional or alternative authentication processes can be used in other embodiments:

1. Type 1 Authentication. Client sends Alice's password to the server. The server either stores her password, or h(pwd). If the server stores her password, it verifies that what it received is what is in its database. If the server stores h(pwd), the server first hashes what it receives, and then compares the result with what is in its database.

2. Type 2 Authentication. Client sends h(pwd) to the server. The server stores h(pwd) or h(h(pwd)). If the server stores h(pwd), it verifies that what it received is what is stored in its database. If the server stores h(h(pwd)), the server first hashes what it received, and then compares the result with what is stored in its database.

3. Type 3 Authentication. Client converts "pwd" to h(pwd), and uses that in a challenge/response protocol in which the server sends a challenge C, and the client sends h(C, h(pwd)). This is an example of what is more generally referred to herein as "challenge-response authentication." The term "challenge-response authentication" as broadly used herein is intended to encompass, for example, known protocols such as the Challenge-Handshake Authentication Protocol (CHAP) and other CHAP-style protocols, all considered Type 3 authentication protocols.

A given one of these authentication processes can be deployed in the following user access scenario:

1. Alice tells her user device (the "client") that she wants to connect to server X.
2. Alice types her password at the client.
3. The client establishes a TLS connection to server X.
4. Server X informs the client which type of authentication process it requires, illustratively a particular one of the three types previously described.
5. The particular required authentication process is performed between the client and server X.

Techniques disclosed herein can provide enhanced security in these and numerous other user access scenarios.

For example, assuming the use of a Type 3 authentication process as described previously, if Alice uses the same password at multiple servers including server X and server Y, and someone steals the database at server X, then the quantity stored for Alice in server X's stolen database can be used to impersonate Alice at server Y.

A similar situation arises in the case of the Type 2 authentication process, in that if server X stores h(pwd), the stolen database from server X can be directly used to impersonate Alice at server Y, if Alice chose the same password at both server X and server Y. If the servers instead store h(h(pwd)), the stolen database will not help the attacker.

It should be noted that these example scenarios are not addressing a dictionary attack on a stolen database, but are instead addressing the case where the stolen database can be directly used, even if the user has chosen a "good" password, but is using that same good password at multiple servers including servers X and Y.

In some embodiments, Alice's credential stored at server X is a hash of her password and the server name, illustratively, h("X," pwd). Then, even if Alice has chosen the same password at both server X and server Y, what server X will store for Alice will be h("X," pwd). This will not equal h("Y," pwd), and so the stored credential at server X if stolen could not be used to impersonate Alice at server Y.

Now consider by way example a malicious server X acting as an active MITM to impersonate Alice at server Y, again under the continued assumption that Alice has chosen the same password at both server X and server Y.

Using Type 2 authentication, without modification of the access credential using the techniques disclosed herein, the MITM attack proceeds as follows:

1. Alice tells client to connect to X, and types pwd at client.
2. Client computes h(pwd).
4. Client establishes TLS connection to X.
5. Client sends h(pwd) to X.
6. Malicious X establishes TLS connection to Y.
7. Says "I'm Alice."
8. Repeats what Alice sent to X, i.e., h(pwd), to Y.
9. X now successfully logged into Y as Alice.

With modification of the access credential using per-server credential customization as disclosed herein, the client instead sends h("X," pwd), which will not work if server X forwards that to server Y, and hence the MITM attack is foiled.

A similar result is achieved in the context of Type 3 authentication. Assuming again that Alice uses the same password at server X and server Y, so both store h(pwd) for Alice, the MITM attack proceeds as follows:

1. Alice tells client to connect to X, and types pwd at client.
2. Client computes h(pwd).
3. Client establishes TLS connection to X and says "I'm Alice."
4. Type 3 authentication is negotiated.
5. X establishes a TLS connection to Y and says "I'm Alice."
6. Y sends challenge C (to X).
7. X forwards C to client.
8. Client responds h(C, h(pwd)).
9. X forwards this to Y, which will believe it is talking to Alice.

With modification of the access credential using per-server credential customization as disclosed herein, the shared secret with server X is h("X," pwd), and the shared secret with server Y is h("Y," pwd), so the MITM attack is once again foiled.

Some embodiments herein utilize additional information commonly referred to as "salt," which is intended to make a dictionary attack using a stolen credential database harder. Illustrative embodiments herein can work with or without salt.

In some embodiments, salt is a constant that a server stores for each user, preferably a different salt value for each user. For example, it could be a random number assigned when the user creates an account, or it could be a sequence number for when the user account was created. It is not secret, and the server in some embodiments may send the salt value to the client, although the server in other embodiments need not do so. The problem salt is intended to address is making it more expensive to do a dictionary attack with a stolen credential file. Without salt, an attacker can compute a table of hashes of potential passwords, and compare that list with the stolen credential file. With salt, the attacker will need to hash the potential passwords again and again, for each salt value.

By way of example, in some embodiments herein that utilize salt, the server does not send the salt to the client, but instead uses the salt locally with the password to compute a value that is compared to the stored hash. Illustrative embodiments can work with a server that uses salt in this way, among numerous other possibilities.

The use of salt in illustrative embodiments herein can provide enhanced security by making an offline dictionary attack against a stolen database more expensive.

As another example, consider Type 2 authentication and a malicious server X acting as an active MITM to impersonate Alice at server Y, first without modification of the access credential utilizing per-server credential customization as disclosed herein, but with salt:

1. Alice tells client to connect to X, and types pwd at client.
2. Client establishes TLS connection to X.
3. Malicious X establishes TLS connection to Y.
4. Says "I'm Alice."
5. Y sends Alice's salt to X.
6. X sends Alice's salt to client.
7. Client sends h(salt, pwd).
8. X forwards that to Y.
9. X now successfully logged into Y as Alice.

With modification of the access credential utilizing per-server credential customization as disclosed herein, the client sends h("X," salt, pwd), which will not work if server X forwards that to server Y, and the MITM attack is foiled.

A similar result is achieved in the case of Type 3 authentication. Salt alone will not foil the MITM attack, but modification of the access credential utilizing per-server credential customization as disclosed herein will foil the MITM attack.

The foregoing authentication process types and associated interactions between a given client or other user device and multiple servers are examples only, and can be varied in other embodiments.

As indicated previously, per-server credential customization logic 112 in some embodiments can be implemented at least in part on a separate processing platform, possibly as part of a web-based authentication service. It is also possible for at least portions of the per-server credential customization logic 112 to be deployed on one or more of the same platforms as the web servers 106.

It is to be appreciated that the particular set of system elements and other components and associated functionality as illustrated in the system 100 of the FIG. 1 embodiment is presented by way of example only, and a wide variety of alternative arrangements can be used in other embodiments. For example, the functionality associated with components 110 and 112 in other embodiments can be combined into a single component, or separated across a larger number of components. Additionally or alternatively, at least portions of the components 110 and 112 may be implemented at least in part in the form of software comprising program code stored in memory and executed by a processor.

An illustrative embodiment of an example process for implementing per-server customized access credentials in the information processing system 100 will now be described in more detail with reference to the flow diagram of FIG. 2.

In this embodiment, it is assumed that a user associated with a particular one of the user devices 102, illustratively the user device 102-1, would like to utilize the same password or other access credentials to access multiple distinct access-controlled user accounts of respective websites 107 hosted by different web servers 106.

The process as illustrated includes steps 200 through 206, which are illustratively performed primarily by the user device 102-1 via its web browser 110 and per-server credential customization logic 112, although additional or alternative system components may be used. It is also to be understood that this particular process is only an example, and additional or alternative processes can be carried out in other embodiments.

In step 200, access credentials are obtained. The access credentials are for accessing a protected resource via a server over a network, and may be obtained, for example, directly from a user that enters them into a user interface of a browser, or retrieved from a memory or other storage device in which they were previously stored. The term "obtaining access credentials" as used herein is therefore intended to be broadly construed. It is assumed in illustrative embodiments that the user wishes to utilize the same access credentials to access multiple distinct protected resources via respective separate servers.

In step 202, at least a portion of the obtained access credentials is modified based at least in part on identifying information of at least one of the protected resource and the server, in a manner compliant with one or more credential format rules for the protected resource. For example, in some embodiments, modifying at least a portion of the obtained access credentials based at least in part on identifying information of at least one of the protected resource and the server more particularly comprises hashing a first password of the obtained access credentials with the identifying information to generate a second password different than the first password but compliant with the one or more credential format rules for the protected resource. Other types of credential modification can be used in other embodiments.

In step 204, the modified access credentials are utilized in place of the obtained access credentials in an authentication protocol carried out with the server in order to access the protected resource.

In step 206, steps 202 and 204 are repeated one or more additional times for accessing respective different protected resources via respective different servers over the network, using the same obtained access credentials from step 200. For example, in each such iteration, different identifying information of at least one of the protected resource and the server of that particular iteration is utilized to generate different modified credentials from the original obtained access credentials.

The particular processing operations and other system functionality described in conjunction with the flow diagram of FIG. 2 are presented by way of illustrative example only, and should not be construed as limiting the scope of the present disclosure in any way. Alternative embodiments can use other types of processing operations to implement per-server customized access credentials. For example, certain steps may be performed at least in part concurrently with one another rather than serially. As additional examples, at least portions of the process steps may be repeated periodically for different authentication instances, and multiple such instances can be performed in parallel with one another to allow a given user to obtain access to different protected resources using the same original access credentials.

Also, functionality such as that described in conjunction with the flow diagram of FIG. 2 can be implemented at least in part in the form of one or more software programs stored in program code of at least one memory and executed by at least one processor in one or more processing devices implementing per-server customized access credentials as disclosed herein. A storage device or other memory having executable program code of one or more software programs embodied therein is an example of what is more generally referred to herein as a "processor-readable storage medium."

The foregoing example process is therefore illustrative only, and should not be viewed as limiting the scope of any particular embodiment in any way. Those skilled in the art will appreciate that numerous alternative authentication arrangements for per-server customized access credentials can be used in other embodiments.

Additional illustrative embodiments of per-server credential customization arrangements will now be described with reference to FIGS. 3, 4 and 5.

Figure 3:
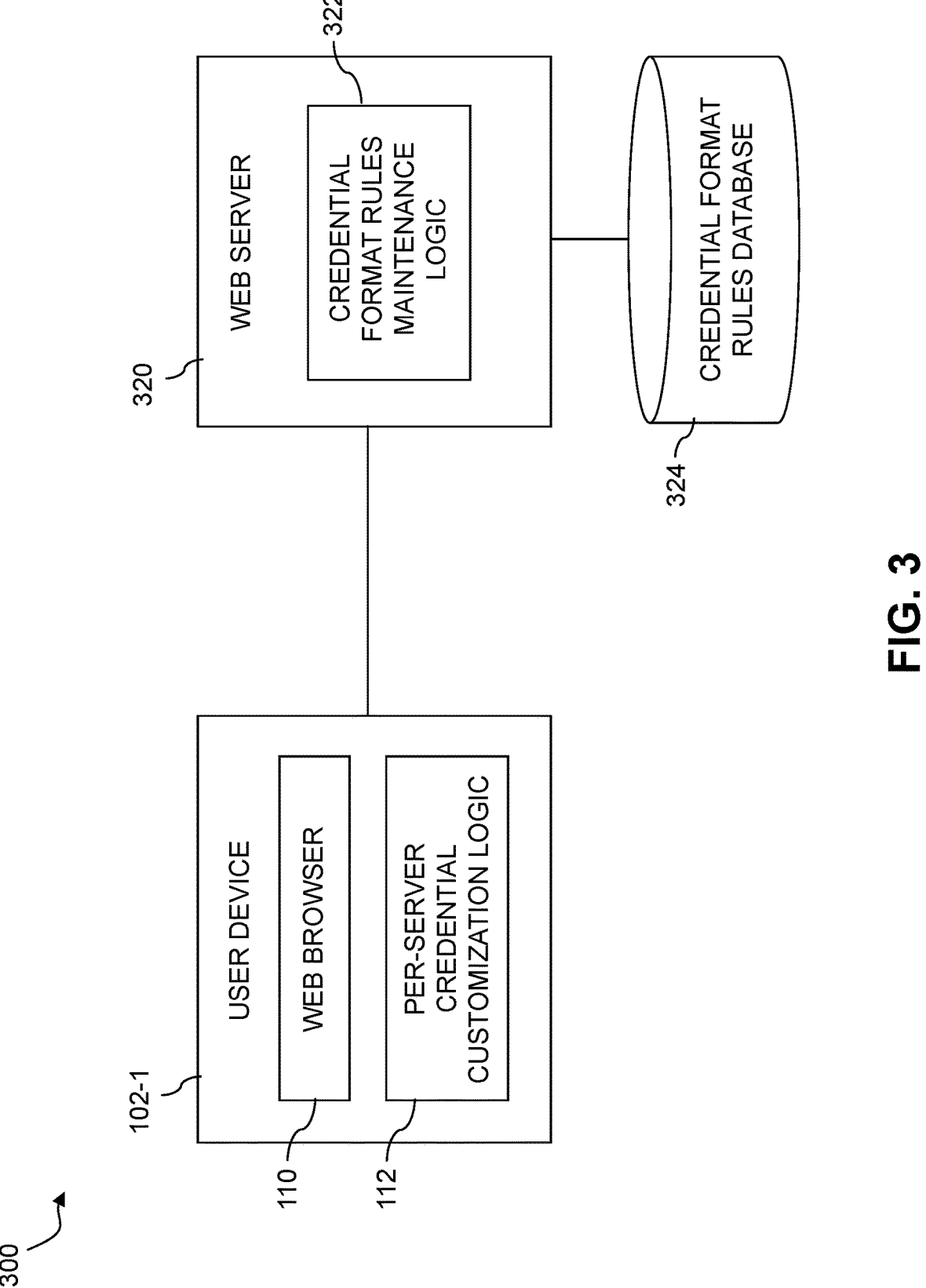
FIG. 3 illustrates an example arrangement for obtaining credential format rules from an external source in an illustrative embodiment.

FIG. 3 shows system components 300 that may be part of an information processing system such as system 100 in some embodiments. The system components 300 in this embodiment include the user device 102-1 and its web browser 110 and per-server credential customization logic 112, all as previously described. Also included in the system components 300 are a web server 320, credential format rules maintenance logic 322 within the web server 320, and an associated credential format rules database 324.

The web server 320 is an example of what is more generally referred to herein as an "external source" of one or more credential format rules. For example, the web server 320 may comprise a particular one of the web servers 106. Alternatively, the web server 320 may comprise a separate server that gathers credential format rules from the web servers 106 and makes them available to the per-server credential customization logic 112 of the user device 102-1 in a central repository. The central repository in this example illustratively comprises the credential format rules database 324. The credential format rules database 324 illustratively stores a plurality of different sets of one or more credential format rules for respective ones of a plurality of protected resources, such as the websites 107 of the respective web servers 106. As indicated previously, similar functionality for maintaining credential format rules for a single one of the web servers 106 can be implemented in some embodiments.

Examples of credential format rules for a given protected resource include that a password utilized to access the protected resource must contain at least one character of each of a plurality of designated types (e.g., uppercase, lowercase, number and/or special), and at least 10 characters in total. The per-server credential customization logic 112 in some embodiments obtains such credential format rules from the web server 320, which utilizes its credential format rules maintenance logic 322 to determine the credential format rules and to store them in the credential format rules database 324. The per-server credential customization logic 112 then generates a custom credential that is compliant with the one or more credential format rules for the corresponding website or other protected resource.

As indicated previously, the FIG. 3 arrangement can be used to provide an online repository for multiple distinct sets of one or more credential format rules for respective websites or other protected resources. Such an online repository facilitates the operation of the per-server credential customization logic 112 in meeting the particular credential format rules of a given protected resource when generating a modified password or other modified credential to access that protected resource.

In some embodiments, the user-device 102-1 can itself be configured to implement at least portions of the functionality of the web server 320 and its credential format rules maintenance logic 322, by gathering and storing sets of one or more credential format rules for respective web sites or other protected resources. Accordingly, in some embodiments, at least portions of the credential format rules maintenance logic 322 and its associated credential format rules database 324 may be implemented in the user device 102-1.

Figure 4:
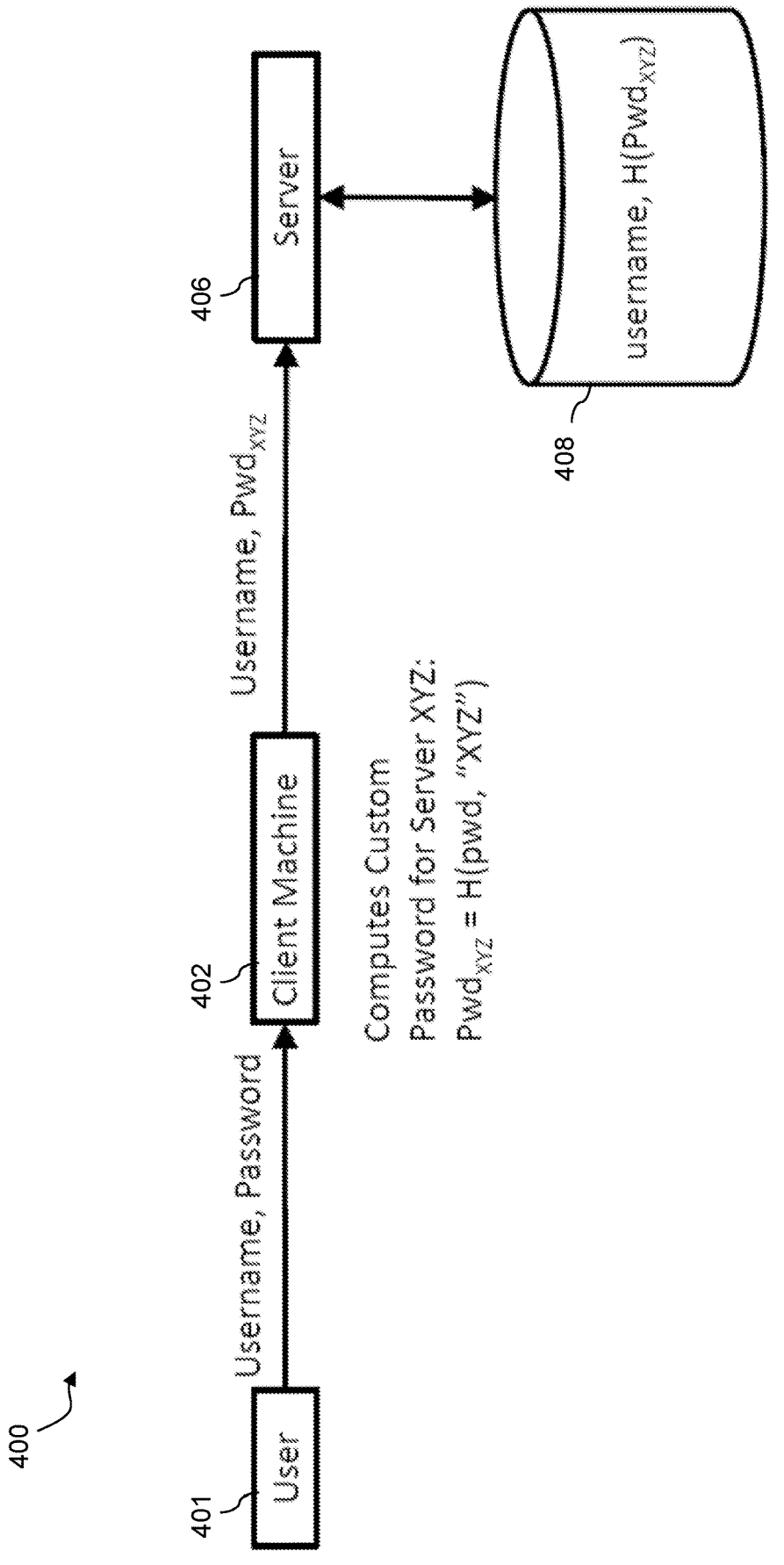
FIG. 4 shows one possible example of a per-server customized password arrangement, in an illustrative embodiment in which a server stores a hash of a user password for user authentication.

Referring now to FIG. 4, an information processing system 400 implementing a per-server customized password arrangement is shown. The system 400 comprises a user 401, a client machine 402, a server 406 and a credential database 408. In this embodiment, it is assumed that the server 406 stores in credential database 408 a hash of a modified password previously generated by client machine 402 for user authentication. Additional information such as a username is also assumed to be stored in association with the hash of the modified password in the credential database 408.

The user 401 submits a username and password to the client machine 402 in order to obtain access to a protected resource associated with the server 406. The client machine 402 via per-server credential customization logic thereof computes a custom password for the server 406, which is also referred to as server XYZ, where XYZ denotes example identifying information of the server 406.

The custom password in this embodiment is given by $Pwd_{XYZ}$=H(pwd, "XYZ"), where H denotes a hash function, such as an instance of an SHA (e.g., SHA256, SHA512, etc.) of a type well-known to those skilled in the art, and "pwd" denotes the password submitted by the user 401. The client machine 402 submits the username and modified password $Pwd_{XYZ}$ to the server 406. The server 406 in its credential database 408 had previously stored the username in association with a hash of the modified password $Pwd_{XYZ}$ and upon receipt of the username and modified password $Pwd_{XYZ}$ from the client machine 402, the server 406 generates a hash of the received modified password $Pwd_{XYZ}$ and compares it with the corresponding entry in the credential database 408. Responsive to a match being obtained, the user 401 is granted access to the protected resource associated with server 406.

Figure 5:
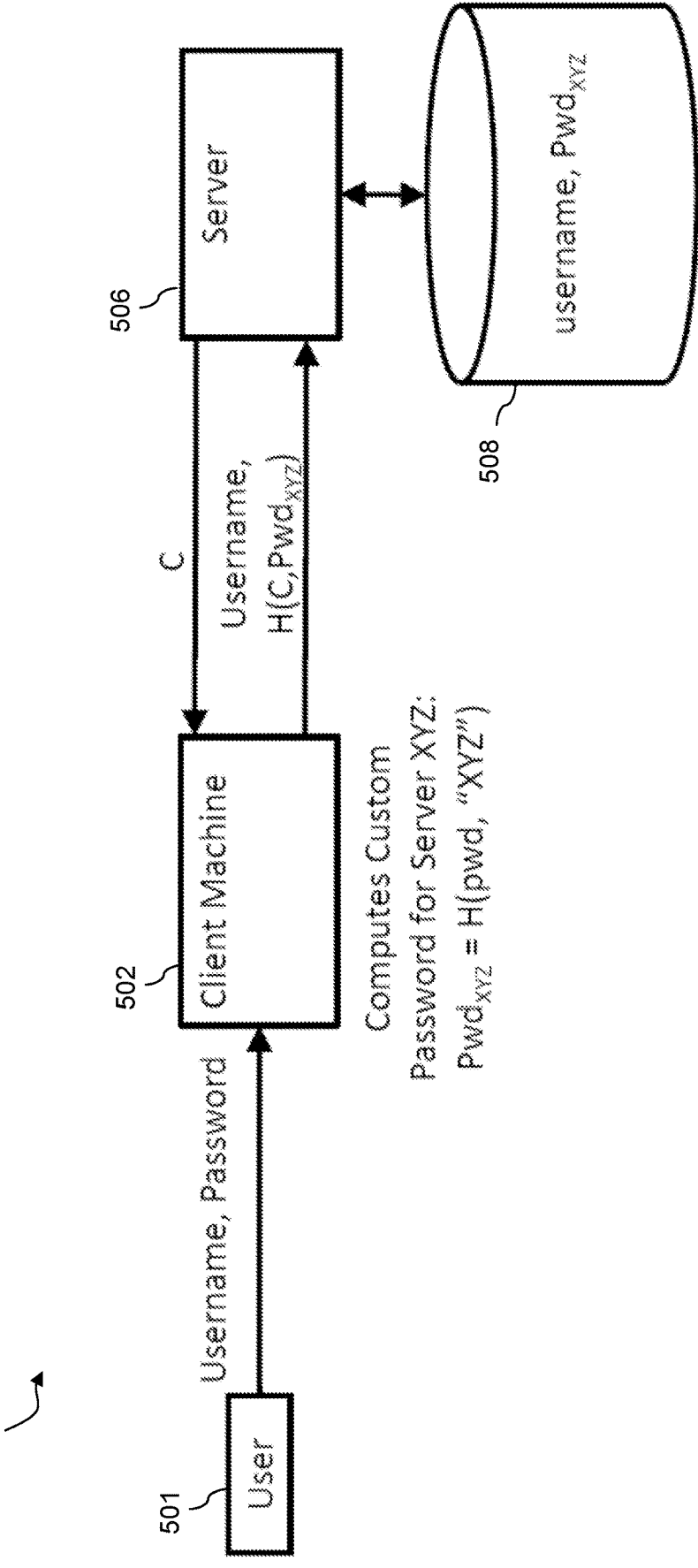
FIG. 5 shows another example of a per-server customized password arrangement in an illustrative embodiment in which a server implements a challenge-response protocol for user authentication.

FIG. 5 shows another example of a per-server customized password arrangement, in this case in an embodiment in which a server implements a challenge-response protocol for user authentication. In this embodiment, an information processing system 500 comprises a user 501, a client machine 502, a server 506 and a credential database 508. It is assumed that the server 506 stores in credential database 508 a modified password previously generated by the client machine 502 for user authentication. Additional information such as a username is also assumed to be stored in association with the modified password in the credential database 508.

The user 501 submits a username and password to the client machine 502 in order to obtain access to a protected resource associated with the server 506. As in the embodiment of FIG. 4, the client machine 502 in the present embodiment via per-server credential customization logic thereof computes a custom password for the server 506, which is also referred to as server XYZ, where XYZ denotes example identifying information of the server 506.

The custom password generated by client machine 502 in this embodiment is once again given by $Pwd_{XYZ}$=H(pwd, "XYZ"). The client machine 502 receives a challenge C from the server 506 in conjunction with its attempt to access the protected resource, and in response to receiving the challenge C computes a hash of the challenge C and the modified password $Pwd_{XYZ}$ and submits the result and the username to the server 506. The server 506 in its credential database 508 had previously stored the username in association with the modified password $Pwd_{XYZ}$ and upon receipt of the username and the hash of the challenge C and the modified password $Pwd_{XYZ}$ from the client machine 502, the server 506 obtains the modified password $Pwd_{XYZ}$ from its credential database 508, generates a hash of the challenge C and the modified password $Pwd_{XYZ}$, and compares that result with what was received from the client machine 502. Responsive to a match being obtained, the user 501 is granted access to the protected resource associated with server 506.

The illustrative embodiments of FIGS. 3, 4 and 5, like other embodiments disclosed herein, are presented by way of example only, and the features and functionality thereof should not be considered as limiting in any way.

Illustrative embodiments provide a number of significant advantages relative to conventional arrangements.

For example, one or more such embodiments provide techniques for implementing per-server customized access credentials. Such embodiments configure a client device or other type of user device to generate customized access credentials for respective ones of multiple servers from a single common access credential or portion thereof.

These and other embodiments advantageously provide substantially enhanced security, by limiting vulnerability to user impersonation and MITM attacks.

Moreover, illustrative embodiments are simple to implement without requiring any modification to the servers or their respective interfaces.

Illustrative embodiments can be configured to effectively allow a given user to utilize the same username and password or other access credentials to access multiple distinct websites or other protected resources, without requiring any modification to those websites or other protected resources.

For example, some embodiments implement a client device configured to hash a user-typed password with a server identifier and to convert the result into a character string acceptable to the server as a password. Numerous alternative per-server credential customization arrangements are possible using the disclosed techniques.

Illustrative embodiments can advantageously operate with any of a wide variety of existing authentication protocols, including CHAP-style protocols and other types of challenge-response protocols.

The disclosed techniques are therefore simple to implement in illustrative embodiments, and can be adapted in a straightforward manner for use with a wide variety of different types of authentication processes involving numerous different types of protected resources and access credentials.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement processing devices with functionality for per-server customized access credentials will now be described in greater detail with reference to FIGS. 6 and 7. Although described in the context of system 100, these platforms may also be used to implement at least portions of other information processing systems in other embodiments.

Figure 6:
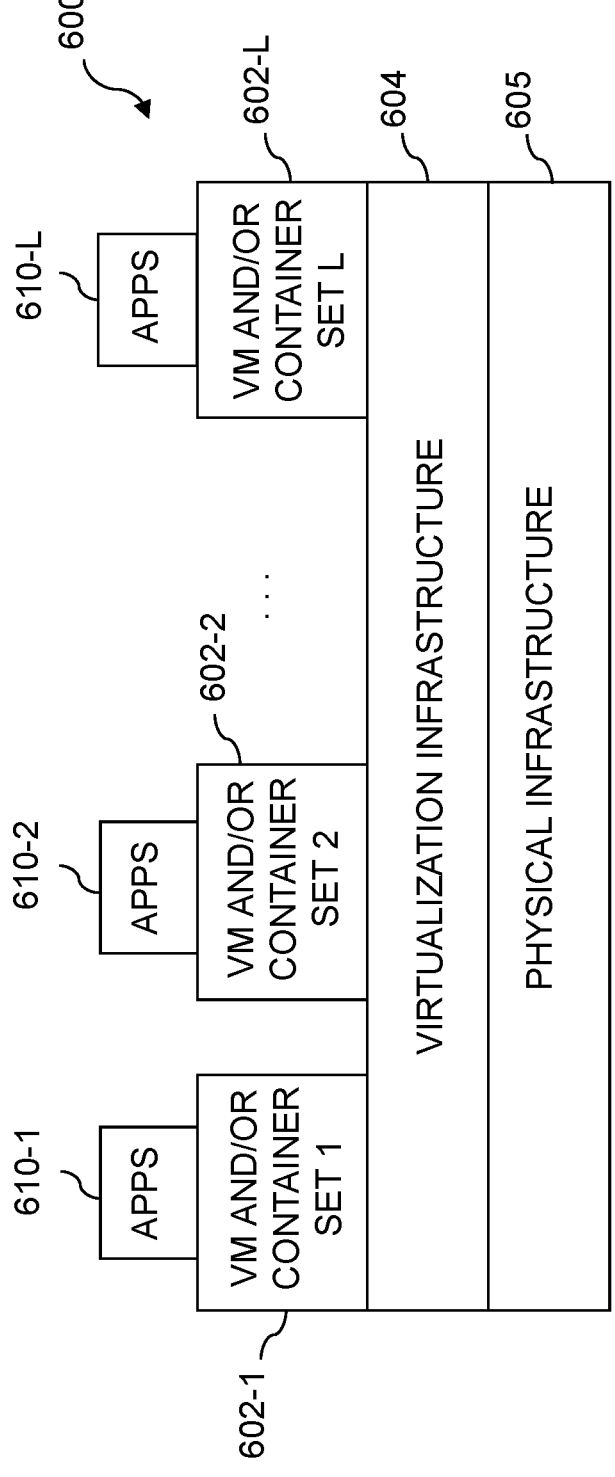
FIGS. 6 and 7 show examples of processing platforms that may be utilized to implement at least a portion of an information processing system in illustrative embodiments.
Figure 7:
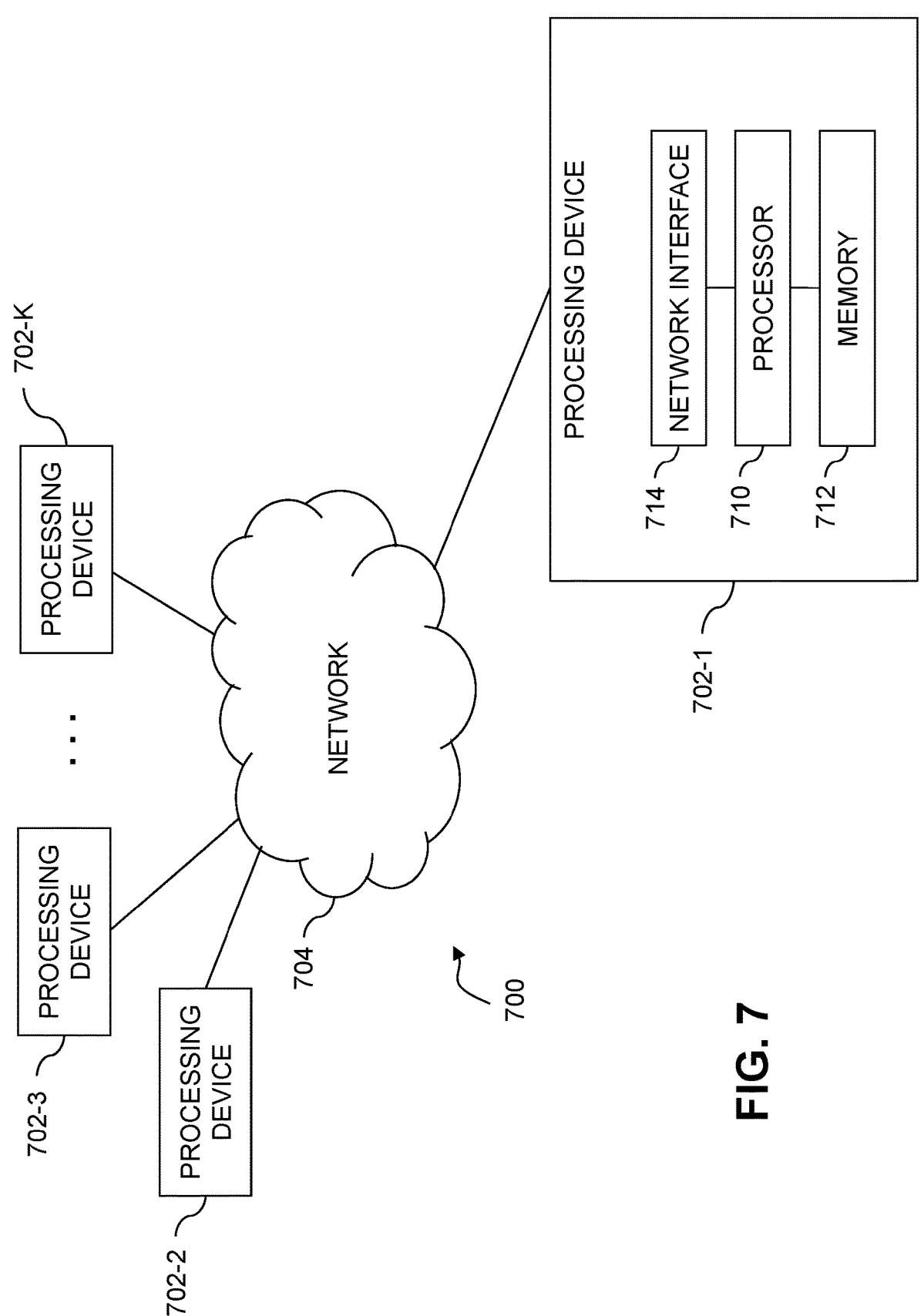

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide at least portions of the disclosed per-server credential customization functionality in an information processing system of the type described above using one or more processes running on a given one of the VMs. For example, each of the VMs can implement logic instances and/or other components providing functionality associated with per-server customized access credentials in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide at least portions of the disclosed per-server credential customization functionality in an information processing system of the type described above. For example, a container host device supporting multiple containers of one or more container sets can implement logic instances and/or other components providing functionality associated with per-server customized access credentials in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for per-server customized access credentials provided by one or more components of an information processing system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, user devices, networks, servers, authentication processes, access credentials, protected resources, per-server credential customization logic and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory, the at least one processing device further comprising credential customization logic implemented at least in part utilizing the processor and the memory;

wherein the at least one processing device is configured:

to obtain, using the credential customization logic, access credentials for accessing a protected resource via a server over a network;

to modify, using the credential customization logic, at least a portion of the obtained access credentials based at least in part on identifying information of at least one of the protected resource and the server, by applying a designated function to the at least a portion of the obtained access credentials in combination with the identifying information; and in response to a given user requesting access to the protected resource, to utilize the modified access credentials in place of the obtained access credentials in an authentication protocol carried out with the server;

wherein the modified access credentials are generated at least in part by a corresponding automatic translation operation performed on the obtained access credentials by the credential customization logic;

wherein a different automatic translation operation is performed by the credential customization logic on the obtained access credentials to generate different modified access credentials for accessing a different protected resource;

wherein the designated function when applied to the at least a portion of the obtained access credentials in combination with first identifying information of at least one of a first protected resource and a first server produces first modified access credentials, and further wherein the designated function when applied to the at least a portion of the obtained access credentials in combination with second identifying information of at least one of a second protected resource and a second server, different than the first protected resource and first server, produces second modified access credentials different than the first modified access credentials, the designated function thereby producing, for a given set of access credentials of the given user, different modified access credentials for different instances of the at least one of the protected resource and the server; and wherein utilizing the modified access credentials in place of the obtained access credentials in the authentication protocol carried out with the server comprises:

sending a modified password of the modified access credentials to the server, the modified password being generated utilizing a password of the obtained access credentials;

receiving a challenge from the server; and sending to the server a result of performing one or more hash operations on (i) the challenge received from the server and (ii) the modified password, at least one of the one or more hash operations being applied to both the challenge and the modified password.

2. The apparatus of claim 1 wherein modifying at least a portion of the obtained access credentials comprises modifying at least a portion of the obtained access credentials in a manner compliant with one or more credential format rules for the protected resource.

3. The apparatus of claim 1 wherein the access credentials comprise a username and the password, and wherein the protected resource comprises an access-controlled user account of a website hosted at least in part by the server.

4. The apparatus of claim 1 wherein the at least one processing device comprises at least a portion of a user device configured to communicate with the server over the network.

5. The apparatus of claim 1 wherein modifying at least a portion of the obtained access credentials based at least in part on identifying information of at least one of the protected resource and the server comprises hashing a first password of the obtained access credentials with the identifying information to generate a second password different than the first password but compliant with one or more credential format rules for the protected resource.

6. The apparatus of claim 1 wherein the identifying information of at least one of the protected resource and the server comprises at least an identifier of at least one of the protected resource and the server.

7. The apparatus of claim 1 wherein modifying at least a portion of the obtained access credentials based at least in part on identifying information of at least one of the protected resource and the server comprises performing one or more hash operations on at least a portion of the obtained access credentials utilizing the identifying information of at least one of the protected resource and the server.

8. The apparatus of claim 7 wherein modifying at least a portion of the obtained access credentials based at least in part on identifying information of at least one of the protected resource and the server further comprises converting a result of performing the one or more hash operations into a character string that complies with one or more credential format rules for the protected resource.

9. The apparatus of claim 7 wherein modifying at least a portion of the obtained access credentials comprises generating the modified password at least in part by performing the one or more hash operations on the password of the obtained access credentials using the identifying information of at least one of the protected resource and the server.

10. The apparatus of claim 1 wherein utilizing the modified access credentials in place of the obtained access credentials in the authentication protocol carried out with the server comprises sending a username of the access credentials in unmodified form to the server with the modified password.

11. The apparatus of claim 1 wherein utilizing the modified access credentials in place of the obtained access credentials in the authentication protocol carried out with the server comprises sending a username of the access credentials in unmodified form to the server with the result of performing one or more hash operations on (i) the challenge received from the server and (ii) the modified password.

12. The apparatus of claim 1 wherein the at least one processing device is further configured to obtain at least a portion of one or more credential format rules for the protected resource from at least one external source.

13. The apparatus of claim 12 wherein the at least one external source comprises the server associated with the protected resource.

14. The apparatus of claim 12 wherein the at least one external source comprises a database that stores a plurality of different sets of one or more credential format rules for respective ones of a plurality of protected resources.

15. A computer program product comprising a non-transitory processor-readable storage medium having stored therein program code of one or more software programs, wherein the program code when executed by at least one processing device causes the at least one processing device:

to obtain, using credential customization logic of the at least one processing device, access credentials for accessing a protected resource via a server over a network;

to modify, using the credential customization logic, at least a portion of the obtained access credentials based at least in part on identifying information of at least one of the protected resource and the server, by applying a designated function to the at least a portion of the obtained access credentials in combination with the identifying information; and in response to a given user requesting access to the protected resource, to utilize the modified access credentials in place of the obtained access credentials in an authentication protocol carried out with the server;

wherein the modified access credentials are generated at least in part by a corresponding automatic translation operation performed on the obtained access credentials by the credential customization logic;

wherein a different automatic translation operation is performed by the credential customization logic on the obtained access credentials to generate different modified access credentials for accessing a different protected resource;

wherein the designated function when applied to the at least a portion of the obtained access credentials in combination with first identifying information of at least one of a first protected resource and a first server produces first modified access credentials, and further wherein the designated function when applied to the at least a portion of the obtained access credentials in combination with second identifying information of at least one of a second protected resource and a second server, different than the first protected resource and first server, produces second modified access credentials different than the first modified access credentials, the designated function thereby producing, for a given set of access credentials of the given user, different modified access credentials for different instances of the at least one of the protected resource and the server; and wherein utilizing the modified access credentials in place of the obtained access credentials in the authentication protocol carried out with the server comprises:

sending a modified password of the modified access credentials to the server, the modified password being generated utilizing a password of the obtained access credentials;

receiving a challenge from the server; and sending to the server a result of performing one or more hash operations on (i) the challenge received from the server and (ii) the modified password, at least one of the one or more hash operations being applied to both the challenge and the modified password.

16. The computer program product of claim 15 wherein modifying at least a portion of the obtained access credentials based at least in part on identifying information of at least one of the protected resource and the server comprises performing one or more hash operations on at least a portion of the obtained access credentials utilizing the identifying information of at least one of the protected resource and the server.

17. The computer program product of claim 15 wherein utilizing the modified access credentials in place of the obtained access credentials in the authentication protocol carried out with the server comprises sending a username of the access credentials in unmodified form to the server with at least one of:

the modified password; and the result of performing one or more hash operations on (i) the challenge received from the server and (ii) the modified password.

18. A method comprising:

obtaining, using credential customization logic of at least one processing device, access credentials for accessing a protected resource via a server over a network;

modifying, using the credential customization logic, at least a portion of the obtained access credentials based at least in part on identifying information of at least one of the protected resource and the server, by applying a designated function to the at least a portion of the obtained access credentials in combination with the identifying information; and in response to a given user requesting access to the protected resource, utilizing the modified access credentials in place of the obtained access credentials in an authentication protocol carried out with the server;

wherein the modified access credentials are generated at least in part by a corresponding automatic translation operation performed on the obtained access credentials by the credential customization logic;

wherein a different automatic translation operation is performed by the credential customization logic on the obtained access credentials to generate different modified access credentials for accessing a different protected resource;

wherein the designated function when applied to the at least a portion of the obtained access credentials in combination with first identifying information of at least one of a first protected resource and a first server produces first modified access credentials, and further wherein the designated function when applied to the at least a portion of the obtained access credentials in combination with second identifying information of at least one of a second protected resource and a second server, different than the first protected resource and first server, produces second modified access credentials different than the first modified access credentials, the designated function thereby producing, for a given set of access credentials of the given user, different modified access credentials for different instances of the at least one of the protected resource and the server;

wherein utilizing the modified access credentials in place of the obtained access credentials in the authentication protocol carried out with the server comprises:

sending a modified password of the modified access credentials to the server, the modified password being generated utilizing a password of the obtained access credentials;

receiving a challenge from the server; and sending to the server a result of performing one or more hash operations on (i) the challenge received from the server and (ii) the modified password, at least one of the one or more hash operations being applied to both the challenge and the modified password; and wherein the method is performed by the at least one processing device, the at least one processing device comprising a processor coupled to a memory.

19. The method of claim 18 wherein modifying at least a portion of the obtained access credentials based at least in part on identifying information of at least one of the protected resource and the server comprises performing one or more hash operations on at least a portion of the obtained access credentials utilizing the identifying information of at least one of the protected resource and the server.

20. The method of claim 18 wherein utilizing the modified access credentials in place of the obtained access credentials in the authentication protocol carried out with the server comprises sending a username of the access credentials in unmodified form to the server with at least one of:

the modified password; and the result of performing one or more hash operations on (i) the challenge received from the server and (ii) the modified password.

* * * * *